L. B. WEST.
APPARATUS FOR PREPARING PAVING MATERIALS.
APPLICATION FILED AUG. 7, 1915.

1,351,361.

Patented Aug. 31, 1920.
7 SHEETS—SHEET 1.

WITNESSES:

INVENTOR.
L. B. West
BY J. Stockman
ATTORNEY.

Fig. 4

L. B. WEST.
APPARATUS FOR PREPARING PAVING MATERIALS.
APPLICATION FILED AUG. 7, 1915.

1,351,361.

Patented Aug. 31, 1920.
7 SHEETS—SHEET 3.

Fig. 5

WITNESSES:
J. M. Fowler Jr.

INVENTOR.
L. B. West.
BY
C. J. Stockman
ATTORNEY.

L. B. WEST.
APPARATUS FOR PREPARING PAVING MATERIALS.
APPLICATION FILED AUG. 7, 1915.

1,351,361.

Patented Aug. 31, 1920.
7 SHEETS—SHEET 5.

WITNESSES:
JM Fowler Jr.

INVENTOR.
L. B. West
BY
C. J. Stockman
ATTORNEY.

L. B. WEST.
APPARATUS FOR PREPARING PAVING MATERIALS.
APPLICATION FILED AUG. 7, 1915.

1,351,361.

Patented Aug. 31, 1920.
7 SHEETS—SHEET 7.

WITNESSES:

INVENTOR.
L. B. West
BY
ATTORNEY.

UNITED STATES PATENT OFFICE.

LAWRENCE BATES WEST, OF CHATTANOOGA, TENNESSEE, ASSIGNOR TO ONE FIRE ASPHALT PLANT COMPANY, OF CHATTANOOGA, TENNESSEE, A CORPORATION OF TENNESSEE.

APPARATUS FOR PREPARING PAVING MATERIALS.

1,351,361.  Specification of Letters Patent.  Patented Aug. 31, 1920.

Application filed August 7, 1915. Serial No. 44,338.

*To all whom it may concern:*

Be it known that I, LAWRENCE BATES WEST, a citizen of the United States, residing at Chattanooga, in the county of Hamilton and State of Tennessee, have invented certain new and useful Improvements in Apparatus for Preparing Paving Materials, of which the following is a specification.

This invention relates to apparatus for mixing paving and building materials and preferably to that type of apparatus for manufacturing asphaltic, bituminous, or other mixtures adapted for street pavings, highways, structural work and analogous uses, in which the mineral aggregate is heated and separated, and the binder is heated and mixed with the aggregate in predetermined proportions under control of the operator. One of its most important purposes is to so combine and correlate the elements for heating and grading the mineral aggregate and for heating the binder, as to bring them into a most compact relation and one in which the heat and power is utilized to the best advantage. Another of the more important purposes of the invention is to provide an apparatus of the kind stated which includes means by which the graded mineral aggregate and the binding material may be mixed with each other in accurate proportions in accordance with the engineers' specifications, this means including weighing or other suitable proportioning devices which according to this part of the invention are so arranged as to be substantially free from the vibrations of the other parts of the apparatus so that their accuracy is not interfered with by such vibrations.

While the plant contains features of novelty and possesses important advantages considered solely as one of non-portable nature, yet portability in a plant of this description is important. Hence, while the invention is not in all respects restricted to a portable plant, it is nevertheless one of the important purposes of the invention to provide a plant which may be readily transported from place to place. In fact, one of the important ends which I have endeavored to reach in the novel combination and correlation of parts by which the structure is rendered most compact and the heat and power developed are utilized to the best advantage, is to bring the apparatus within the limits of the platform of a flat car and the dimensions permitted railway rolling stock, so that it may readily be transported on a flat car and pass through tunnels and under bridges. But with respect to this important purpose of the invention I have had a further purpose in view, to wit, the production of a plant which is separate from the car and whose major portion, comprising for example, heating and power developing means, a drum for the ungraded mineral aggregate, means for grading the mineral aggregate, one or more tanks or reservoirs for the binding material, a mixer for the graded aggregate and binder, and certain other coöperating parts, are mounted as a single entity, so to speak, upon a base frame or platform so that they may be lifted together and supported as a unit in an elevated position, thus releasing the car for other purposes.

In short one of the ultimate or most important purposes of the invention is to provide a plant of the nature stated wherein the elements will be so correlated and combined that the plant as a whole will contain all the elements necessary to treat paving material to bring it into a condition ready to be laid and in which the elements are disposed in novel relations resulting in important economies and increased efficiency.

In accordance with this primary or ultimate purpose of the invention, I have provided a plant wherein (1) a single, common furnace furnishes all the power for operating the plant and the heat required for drying and heating the different ingredients, as well as for keeping the heated materials warm; (2) the heat developed by the furnace is utilized in the most complete, effective and efficient manner; (3) the mechanisms necessary to the treatment of the raw materials are brought into such compact relation, that not only is the heat developed by the furnace most efficiently and completely utilized, but moreover the elements may be mounted on a single flat car or the like and will lie within the limits of clearance permitted railway rolling stock, so that the apparatus as a whole is adapted to pass through tunnels and under bridges; (4) the proportioning elements included in the plant for securing accurate proportioning of the ingredients entering into the mixture will be so arranged that they will not be subjected to excessive jars and (5) the plant may not only, as already stated, be mounted upon a flat car and thereby transported to the place where it is to be used, but contains provisions for raising it from said car and supporting it in elevated position, to permit removal of the car and to provide a stationary plant having sufficient headway for a track, or driveway, and for the convenient positioning of the proportioning elements and receptacles for receiving the final mixtures, in such relations to the remainder of the plant that the force of gravity may be utilized to the best advantage.

In order that the advantages and purposes of the invention may be better understood, attention is called to the fact that very high freight rates are charged on plants built on their own cars and since it is frequently necessary to transport the plant from place to place this item becomes an important one. Moreover, when the plant is built upon and as a part of, a flat car, or the like, the car cannot be released for other uses when the plant has reached its destination and this involves further losses as compared with the present mechanism. If on the other hand, the several parts constituting the plant be shipped as separate units to be assembled at the place where the plant is to be used, the loading of the bulky, heavy and cumbersome separate parts on the car for transportation and the lifting of them from the car and the moving of them laterally and lowering them down to the ground and their assemblage in operative relation when they have reached the place at which they have to be used is a difficult, dangerous, expensive and time consuming operation, which must be repeated whenever the plant is to be used in a different place. Again, in the case of the plant built upon the car, there is no chance for the utilization of the space beneath the car to any but a most limited extent and, of course, the space beneath the car could not be utilized as a place into which wagons may be driven to receive the mixed material from the plant. It has been proposed to mount a plant upon two cars, one part upon one car and another part on the other car, with a space between, and to mount a central tower between the confronting ends of the cars to form a drive way between the latter; but this proposed construction involves the permanent use of two cars with a superstructure and operative parts of the plant which must be assembled when the plant has reached the place where it is to be used and taken apart and packed for shipment when it is to be transported to a different place.

In the present plant, there is a base frame separate from the platform of a flat car but substantially conforming in its dimensions to the dimensions of the latter. Upon this base frame is mounted the means for treating the materials, these parts, in the present exemplifiction of the invention, being the heating and grading means for the aggregate, the heater for the binder and the mixer for uniting these heated materials. However, as to this particular part of the invention, which embraces fundamentally the idea of treating materials and discharging the same gravitationally by mechanism mounted upon a frame capable of being transported by a flat car and elevated as a unit from said car, to thereby permit the passage of teams therebeneath to a position to receive such gravitationally discharged material, other elements may be substituted according to the nature or type and purpose of the mixture. Means are provided for quickly elevating the base frame and the parts of the plant carried thereby, from the car platform and for supporting the same in its elevated position, thus quickly releasing the car for other uses. Moreover, the parts of the plant mounted upon said base frame are so correlated that in their assembled relation they will be within the dimensions of railway rolling stock and there is no need for taking apart the elements on the platform. These elements preferably comprise a heater and power element at one end of the platform; a drum for the aggregate extending longitudinally of the platform, and having its inlet at the end remote from the heater and its outlet adjacent the heater; an outlet for the gaseous products of combustion so arranged that the products of combustion pass through the drum in a direction the reverse of the movement of the aggregate in the drum; means adjacent the aggregate outlet from the drum for grading the aggregate; storage hoppers or bins into which the graded materials are discharged and which hoppers or bins are arranged as shown in such close relation to the heater and drum as to be within a heated zone, so that the materials therein retain their heat; one or more receptacles for heating the binder material conveniently arranged adjacent the end of the aggregate drum remote from the heater; and a mixer between the binder receptacles and the storage bins.

In the accompanying drawings exemplifying the preferred embodiment of the invention.

Referring to the drawings, D indicates any suitable form of vehicle, such as a flat car, provided with the usual floor 11. My improved plant is shown provided with a supporting frame, which preferably comprises side members 13, formed of channel iron and connected by series of cross members 14; said cross members being provided with boxes 15 through which are threaded jack screws 16 provided with supporting feet 17 in the usual manner.

The side members 13 are preferably constructed to project from the sides of the car D, or other vehicle, for the ready attachment of ground supports. I have shown a preferred and satisfactory form of ground supports comprising a frame 18 of structural metal provided with a foot, or base, 19 and with a head 20, which latter is preferably formed of cast metal.

Figure 1:
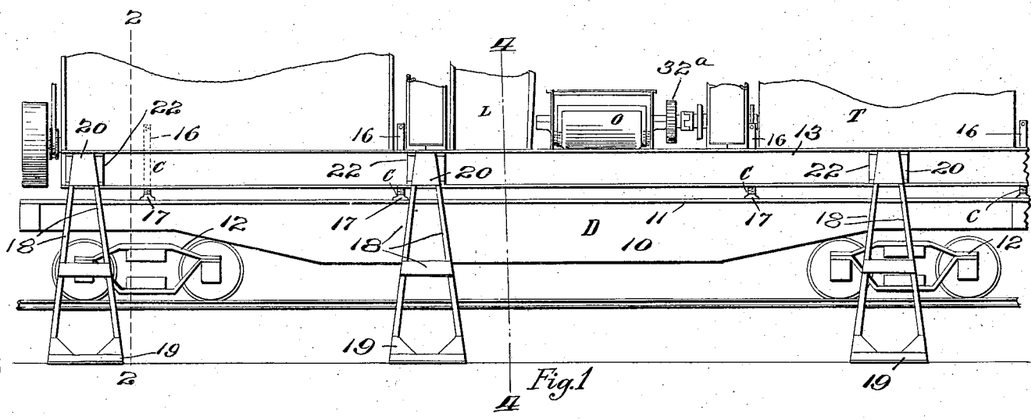
Figure 1 is a fragmentary side elevation showing the lower portion of one embodiment of my invention supported in elevated position on a flat car, and with the detachable ground supports in position.
Figure 2:
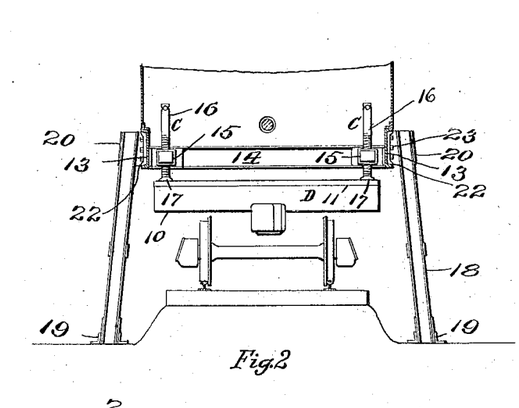
Fig. 2 is a section on the line 2—2 of Fig. 1.
Figure 3:
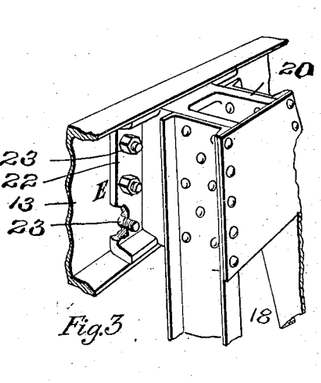
Fig. 3 is a detail perspective view illustrating a preferred means for securing the detachable ground supports to the supporting frame of the plant.
Figure 4:
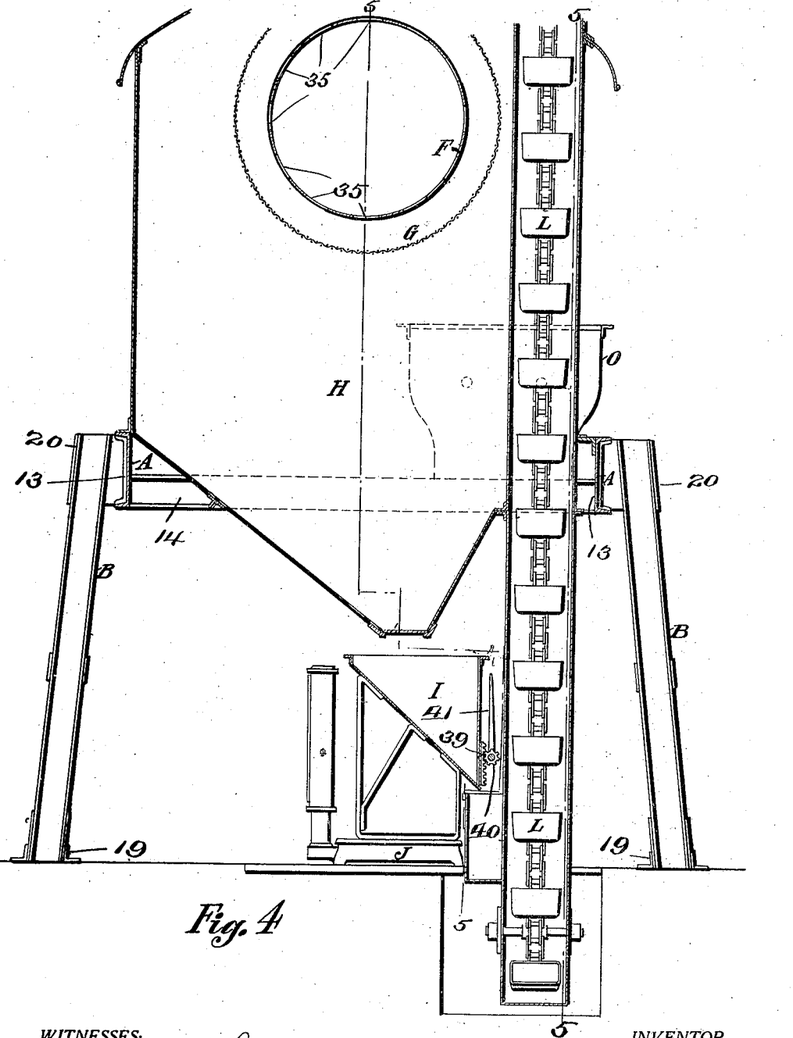
Fig. 4 is a section on the line 4—4 of Figs. 1 and 6.
Figure 5:
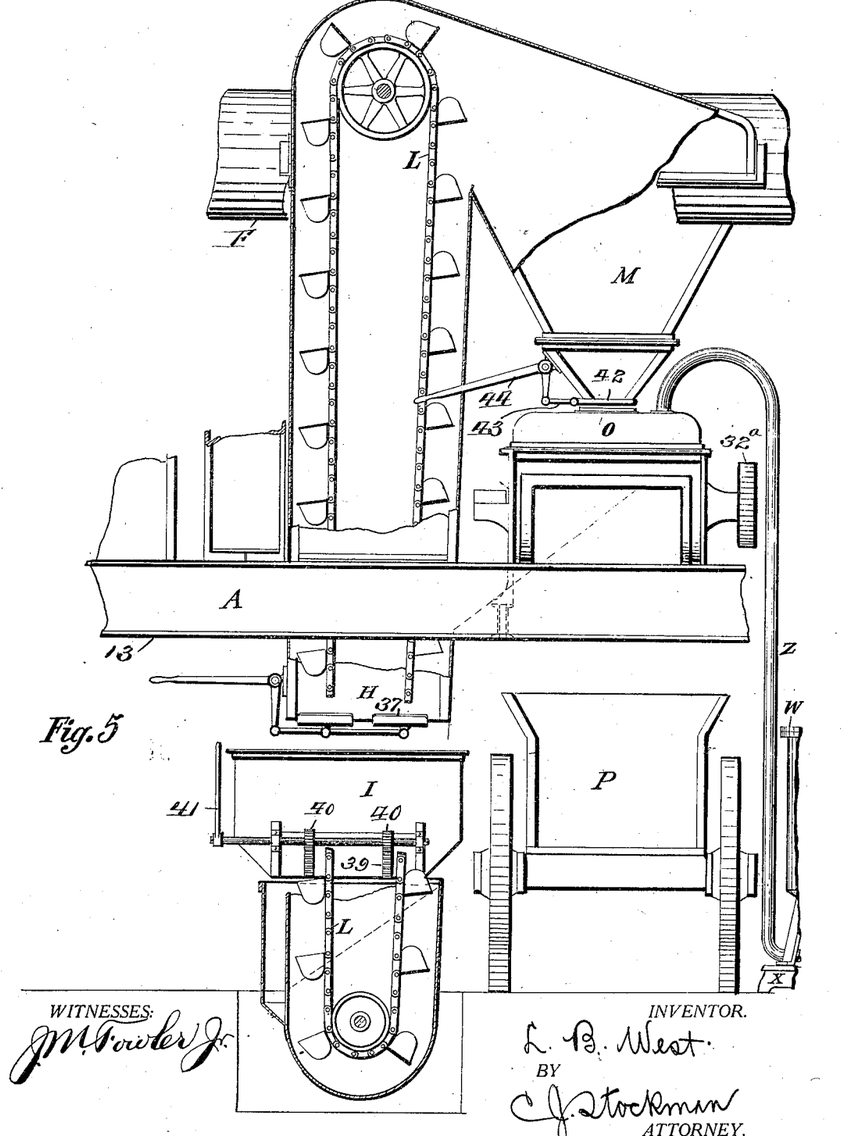
Fig. 5 is a section on the line 5—5 of Fig. 4, with parts broken away for clearness.

The head 20 is formed to fit snugly between the top and bottom flanges of the channel iron 13, and is provided with lateral flanges 22 adapted to be securely clamped to the web of the channel iron 13 by bolts 23. As shown in Fig. 2 the ground supports are preferably constructed of sufficient length to accommodate the usual slight elevation of the road bed, and it will be obvious that said supports can be used under all varying practical conditions, either by blocking them up in the usual way, or by providing pits for receiving their feet.

This provides an improved and highly advantageous construction, by which the plant can be conveniently transported on flat cars, or other suitable vehicles, and readily supported firmly in elevated position, to permit removal of the car and to provide a stationary plant having sufficient free head room for a track, or driveway, and for the convenient positioning of receptacles for receiving the material discharged by gravity from the plant.

My improved construction comprises a boiler furnace A provided with any suitable boiler $C^1$ and having a stack B controlled by a damper 24.

Figure 10:
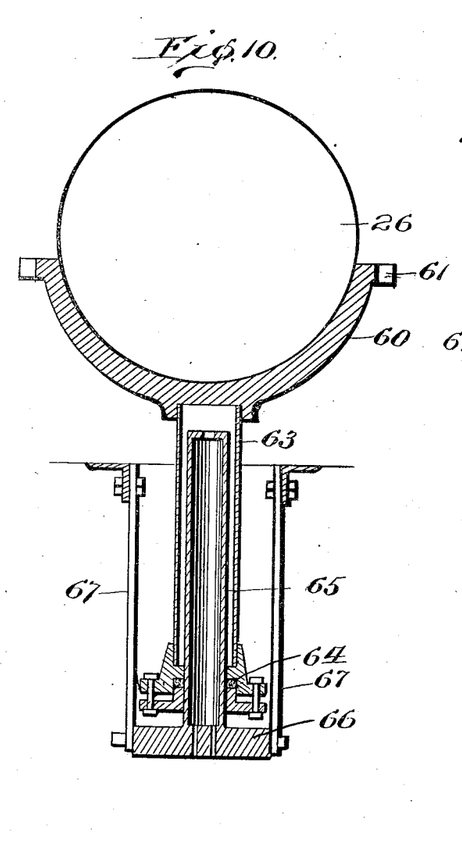
Fig. 10 is a vertical section of the steam-operated valve for controlling the admission of hot gases to the drying and heating drum.
Figure 11:
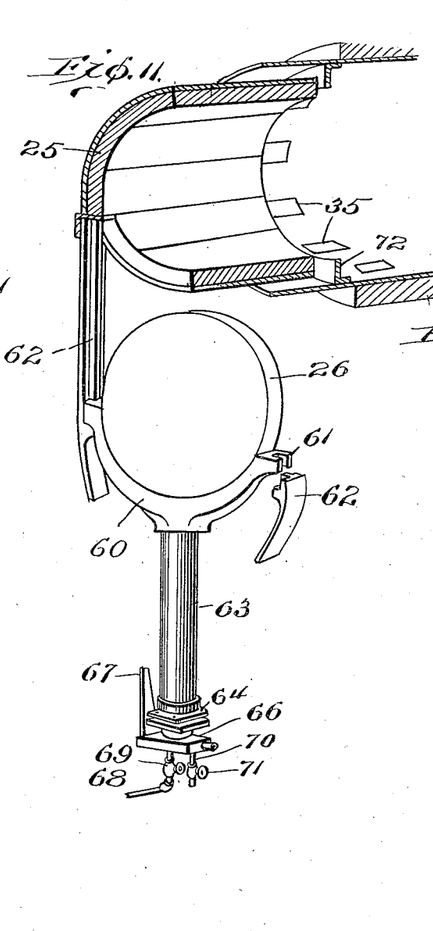
Fig. 11 is a fragmentary perspective view of the valve shown in Fig. 10, and a portion of the flue controlled thereby.

The furnace is provided with a short flue 25 for directing the hot furnace gases through the rotatably mounted drum F for drying and heating the mineral aggregate; said flue being controlled by any suitable valve device. I have shown a preferred form of valve device comprising a disk valve 26 carried by a cradle 60 provided with lugs 61 in guiding engagement with a guide track 62. A power cylinder 63 is secured to the cradle 60 and provided at its lower end with a packing gland 64 for slidably receiving a hollow plunger 65; said plunger being formed with a head 66 stationarily supported by hangers 67. The boiler $C^1$ is connected to the hollow plunger 65 by a steam pipe 68 provided with a valve 69 for admitting steam to the power cylinder 63 for raising the valve 26; an exhaust pipe 70 being secured in communication with the interior of said hollow plunger 65 and provided with a valve 71 for exhausting the steam from said power cylinder 63 to permit lowering of the valve 26 by gravity. This provides a compact and advantageous means for operating the valve 26, in which the packing gland 64 efficiently shields the slidably engaged surfaces of the plunger 65 and cylinder 63 from the lodgment of dust and other foreign matter.

The drum F constitutes a continuation of the flue 25, and conducts the hot gases from the latter to a stack $B^3$ provided with a damper 28; said drum being suitably mounted on bearing rollers 29 and provided with spiral feed members 27 on its inner periphery for gradually feeding the mineral aggregate therethrough.

The drum F is provided with an inner peripheral flange 72 adjacent to the flue 25 for preventing escape of mineral aggregate into the latter, and with a series of discharge openings 35 through its periphery for discharging the dried and heated mineral aggregate to a frusto-conical screening device comprising fine and coarse screens G and $G^1$; said screening device being spaced about the periphery of the drum F and secured to said drum for rotation therewith. Storage hoppers H and $H^1$ are provided for receiving the graded material from the several screens G and $G^1$, and provided with gates 37 for delivering their contents by gravity to a suitable weighing device, such as a receptacle I supported on a platform scale J; said storage hoppers being constructed to inclose the drum F, whereby the radiant waste heat from said drum will be utilized for maintaining the heat of the hot materials in said hoppers.

Such of the aggregate as is too coarse to pass through either screen G or $G^1$ is discharged outside of the storage hoppers or bins through spout 36.

My improved plant is provided with any desired number of tanks T and $T^1$ for heating the asphalt or other binder material; I preferably employ two tanks, so that one tank may be employed for heating the binder material while the previously heated material is being withdrawn from the other tank. The several tanks are shown provided with heating coils $T^2$ connected with the boiler $C^1$ by suitable pipe connections 73, and said tanks are approximately U-shaped in cross section with their legs inclosing the drum F, so that the waste radiant heat from the latter is utilized to augment the effect of said heating coils $T^2$. These tanks are provided with suitable charging doors 45 for the binder material which can be conveniently dumped therein by a crane U. A pipe $53^a$ leads from any suitable air compressor $E^1$ to the tanks T and $T^1$ for blowing air through and agitating the binder material in said tanks; steam being supplied to said compressor by suitable connections to the boiler $C^1$.

The tanks T and $T^1$ are provided with discharge pipes 47 provided with hand valves V and $V^1$ and connected to a common pipe 48 provided with a hand valve 50 and discharging into a receiving funnel 51 of a closed weighing receptacle W supported on a scale X; said funnel being provided with a valve 52 for closing the entrance to said receptacle W.

A discharge pipe Z leads from the bottom of the receptacle W to a closed mixing device O, and the top of said receptacle W is connected to the boiler $C^1$ by a suitable pipe 53 provided with a valve Y; whereby steam can be admitted above the binder material in the receptacle W for forcing a predetermined weight of such material to the mixer O. The weighing receptacle I for the aggregate material discharged from the plant is provided with a suitable gate, or door, for discharging predetermined weights of such material into the closed casing of an elevator L; I have shown such gate provided with a rack 39 in mesh with a pinion 40 operated by a hand lever 41.

The elevator L discharges the aggregate material into a hopper M for delivering it to the closed mixer O; said hopper being provided with a suitable closure, such as a sliding gate 42 connected by a link 43 to an operating bell-crank lever 44. The mixer O is constructed to discharge, or dump, in the usual way into a vehicle P beneath the plant. My improved form of closed mixer provided with closed conduits for feeding predetermined weights of the different materials thereto eliminates the troubles and discomfiture occasioned in previous plants by the large amount of dust driven off by the mixing device.

Figures 7, 8, 9:
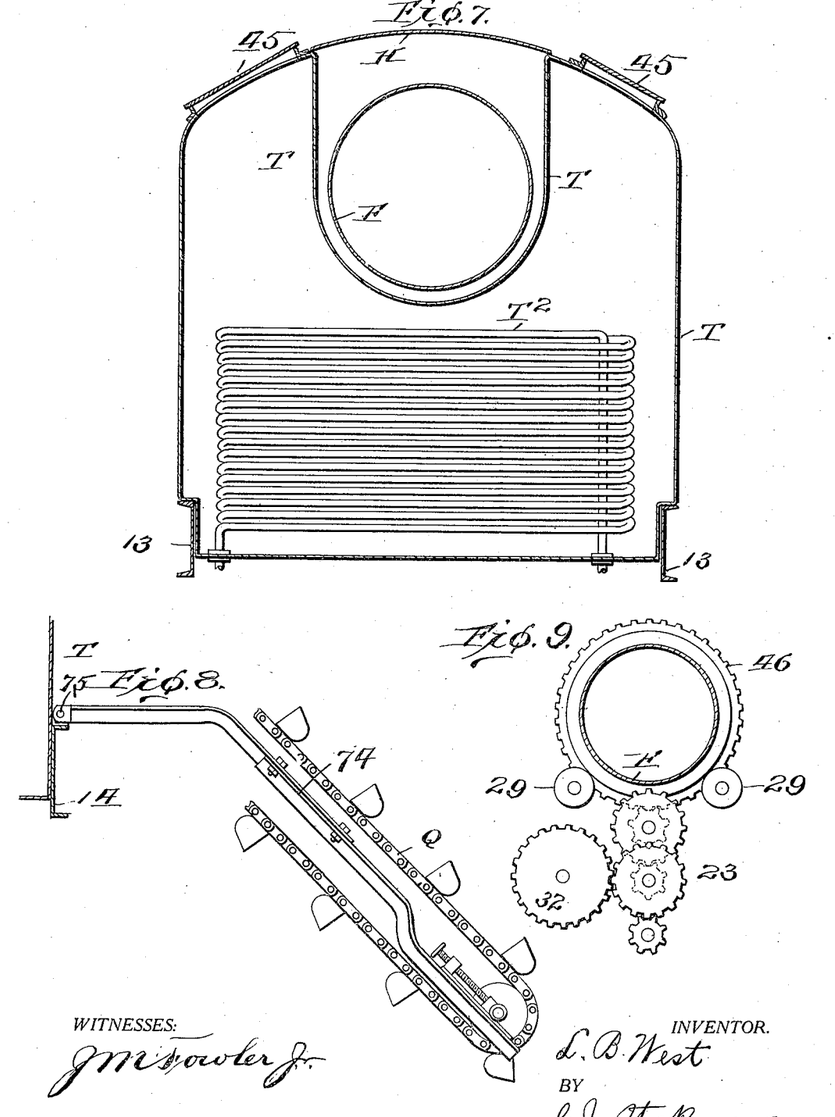
Fig. 7 is a section on the line 7—7 of Fig. 6.
Fig. 8 is a detail elevation of the elevator for supplying the mineral aggregate to the drying and heating drum.
Fig. 9 is a section on the line 9—9 of Fig. 6.

The mineral aggregate is supplied to the drum F by any suitable elevator, such as an endless conveyer Q provided with a discharge spout 33. As shown in Fig. 8, the conveyer is provided with an extensible frame 74 which is pivoted to the plant at 75, thereby enabling said elevator to operate efficiently with supplies of mineral aggregate of different amounts and locations.

Figure 6:
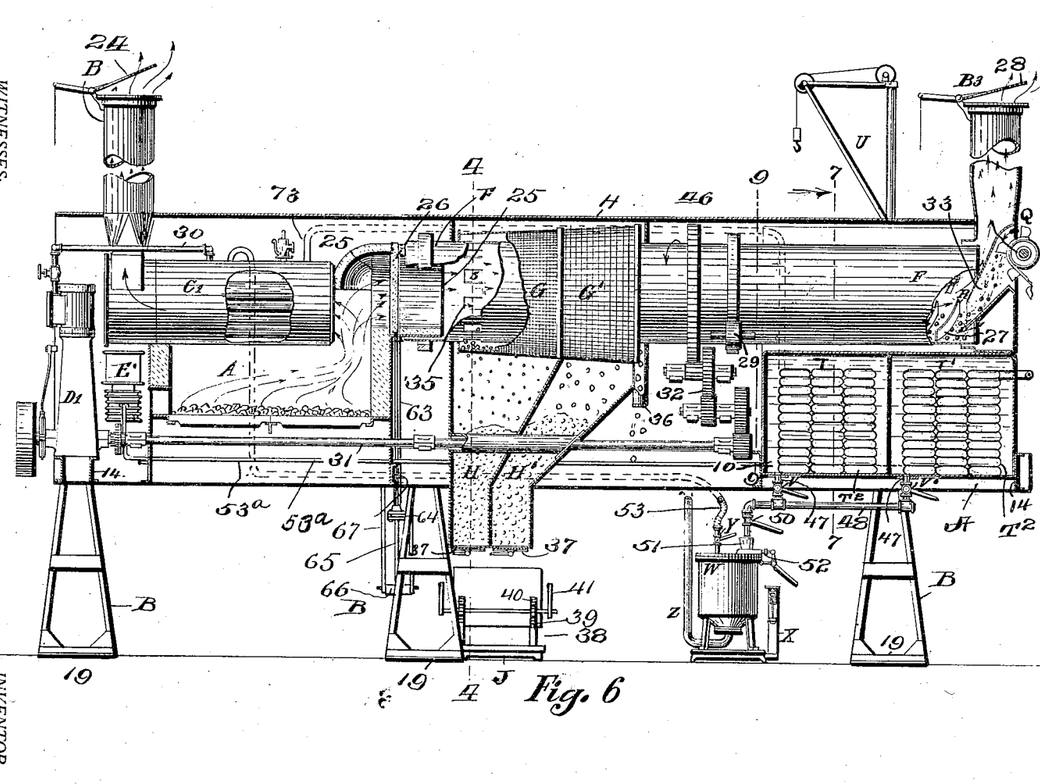
Fig. 6 is a vertical longitudinal section, with parts shown in elevation, showing the plant supported on its ground supports to constitute a stationary plant, after removal of the flat car.

The main engine $D^1$ for operating the various parts of the plant is connected by a valved steam-supply pipe 30 to the boiler $C^1$, and provided with a main engine shaft 31. The drying and heating drum F is rotated by any suitable connection to said engine shaft 31, as by a train of reducing gears 23, shown especially in Figs. 6 and 9, and the mixer can be conveniently driven by a gear 32 driven from said train; the crane U and elevators L and Q being driven from the engine $D^1$ in any usual or convenient manner.

Figure 12:
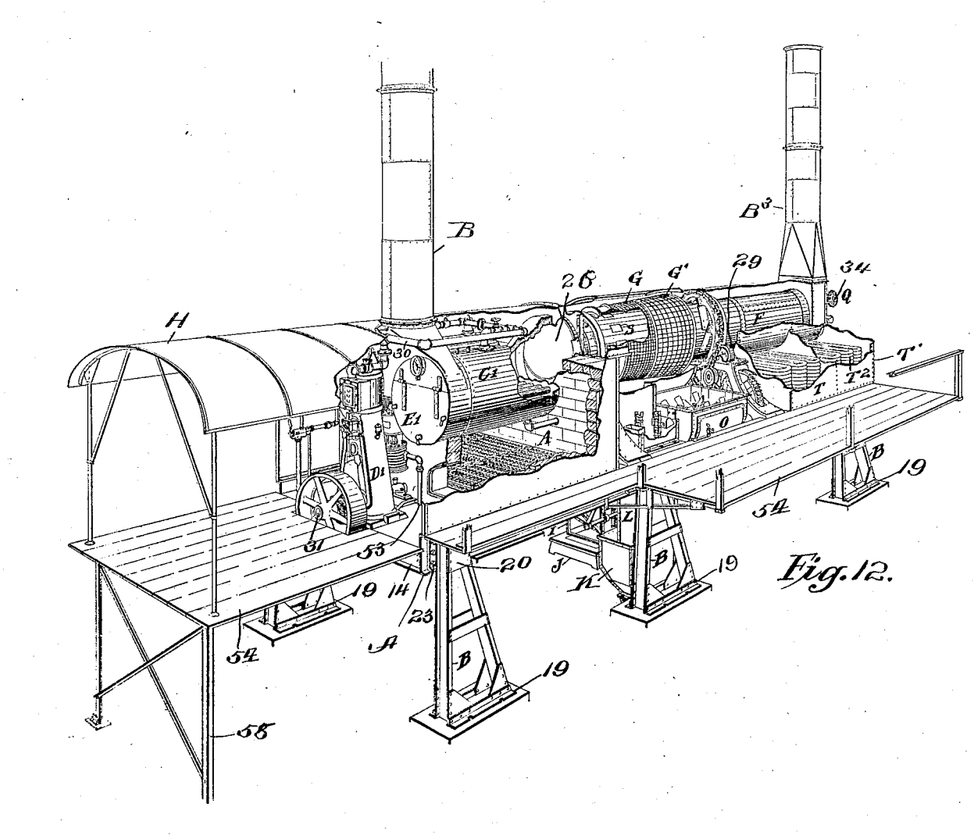
Fig. 12 is a perspective view of the plant with parts broken away for clearness.

As shown in Fig. 12 suitable working platforms 54 can be placed at convenient positions about the plant and supported thereon by angle-iron legs 55.

I have illustrated and described preferred and satisfactory constructions, but changes could be made within the spirit and scope of my invention.

I claim:

1. A plant for manufacturing paving material comprising in combination a furnace, a stack, a longitudinally disposed drum, one end of which opens to the stack and the other end of which is contiguous to the furnace and opens thereto, whereby the products of combustion pass directly from the furnace through the drum to the stack, said drum having an inlet for ungraded aggregate at that end of the drum adjacent the stack and an outlet for the ungraded aggregate at the end adjacent the furnace and means operatively related to the outlet and arranged within the zone of heat radiated from the drum for grading the aggregate.

2. A plant for manufacturing paving material comprising in combination a furnace, a stack, a longitudinally disposed rotative drum, one end of which opens to the stack and the other end of which is contiguous to the furnace and opens thereto, whereby the products of combustion pass directly from the furnace through the drum to the stack, said drum having an inlet for the ungraded aggregate at that end of the drum adjacent the stack, an outlet for the ungraded aggregate at the end adjacent the furnace, and a grading screen surrounding the portion of the drum adjacent the outlet end thereof and rotating with the drum and receiving the material discharged from said outlet.

3. A plant for manufacturing paving material comprising, in combination, a furnace, a stack, a longitudinally disposed rotative drum, one end of which opens to the stack and the other end of which is contiguous to the furnace and opens thereto, whereby the products of combustion pass directly from the furnace through the drum to the stack, said drum having an inlet for the ungraded aggregate at that end of the drum remote from the furnace, an outlet for the ungraded aggregate at the end adjacent the furnace, and a grading means comprising a plurality of screens of different mesh surrounding the portion of the drum adjacent the outlet end thereof and receiving the material discharged from said outlet.

4. A plant for manufacturing paving material comprising a furnace, a longitudinally disposed rotative drum having its discharge end open to and receiving the products of combustion directly from the furnace, an inlet for the ungraded aggregate at the end of the drum remote from the furnace and an outlet for the ungraded aggregate at the end of the drum adjacent the furnace, and bins arranged within the zone of heat radiated from the drum and located in position to receive the material from said grading means.

5. A plant for manufacturing paving material comprising a furnace, a longitudinally disposed rotative drum having its discharge end open to and receiving the products of combustion directly from the furnace, an inlet for the ungraded aggregate at the end of the drum remote from the furnace and an outlet for the ungraded aggregate at the end of the drum adjacent the furnace, means operatively related to the outlet for grading the aggregate and bins arranged within the zone of heat radiated from the drum and located in position to receive the material from said grading means.

6. A plant for manufacturing paving material comprising a furnace, a longitudinally disposed rotative drum through which the products of combustion pass directly from the furnace, an inlet for ungraded aggregate at that end of the drum remote from the furnace and an outlet for the ungraded aggregate at that end of the drum adjacent the furnace, screens carried by and rotative with the drum and serving to grade the aggregate discharged from said outlet and storage bins in proximity to said screens and receiving the aggregate discharged therefrom, said bins being within the zone of heat radiated from the drum.

7. In a one-fire asphalt plant, in combination, a furnace, a stack, a heating drum for the mineral aggregate, one end of which is open to the stack and the other end of which is contiguous to the furnace and opens thereto, whereby the products of combustion pass directly from the furnace through the drum to the stack, a screening means associated with said drum and heated by the products of combustion from the furnace, and a storage means disposed within the zone of heat radiated from the drum.

8. A plant for manufacturing paving material comprising a furnace, a longitudinally disposed rotative drum through which the products of combustion pass directly from the furnace, an inlet for the ungraded aggregate at that end of the drum remote from the furnace, an outlet for ungraded aggregate at that end of the drum adjacent the furnace, means operatively related to the outlet for grading the aggregate, storage bins below the drum and within the zone of heat radiated therefrom and into which the aggregate is discharged from the grading means, proportioning means for the graded aggregate, located beneath said bins, a mixer located in an elevated position and above the proportioning means and an elevator for raising the proportioned aggregate from the proportioning means to the mixer.

9. A plant for manufacturing paving material comprising an inclosing housing, a furnace, a longitudinally disposed rotative drum disposed within the housing and directly connected to the furnace and through which the products of combustion pass directly from the furnace, an inlet for ungraded aggregate at that end of the drum remote from the furnace, an outlet for the ungraded aggregate at that end of the drum adjacent the furnace, means operatively related to the outlet for grading the aggregate, bins associated with the drums for receiving the graded aggregate and a heater for binder material disposed within the housing, said bins and said heater being located within the zone of heat radiated from the drum.

10. A plant for manufacturing paving material comprising a supporting frame, a housing mounted thereon, a furnace carried thereby, a stack, a longitudinally disposed drum through which the products of combustion pass on their way to the stack, an inlet for ungraded aggregate at that end of the drum remote from the furnace and an outlet for ungraded aggregate at that end of the drum adjacent the furnace, means operatively related to the outlet for grading the aggregate, storage bins located within the housing and in position to be subjected to heat radiated from the drum, a weighing device mounted independently of the frame and located beneath said bins and into which said bins discharge, a mixer supported upon the frame and means for elevating material from the weighing device to the mixer.

11. A plant for manufacturing paving material comprising a supporting frame, a housing mounted thereon, a furnace carried thereby, a stack, a longitudinally disposed rotative drum through which the products of combustion pass directly on their way to the stack, an inlet for the ungraded aggregate at that end of the drum remote from the furnace and an outlet for the ungraded aggregate at that end of the drum adjacent the furnace, means operatively related to the outlet for grading the aggregate, storage bins located within the housing and in position to be subjected to heat radiated from the drum, a weighing device beneath said bins and into which said bins discharge, a mixer supported upon the frame and means for elevating material from the weighing device to the mixer, a heater for binder material likewise located within the housing and in such proximity to the drum as to be subjected to heat radiated therefrom, a measuring means for binder material located upon the ground beneath the frame and means for conducting the measured binder material from the measuring means to the mixer.

12. A one fire plant for manufacturing paving material comprising, in combination, a furnace, a stack, a boiler heated by the furnace, a longitudinally disposed rotative drum, one end of which opens to the stack and the other end of which is contiguous to the furnace and opens thereto, to cause the products of combustion to pass directly into the drum and to flow therethrough to the stack, said drum having an inlet for ungraded aggregate at that end of the drum adjacent the stack and an outlet for the ungraded aggregate at the end adjacent the furnace, means operatively related to the outlet and arranged within the zone of heat radiated from the drum for grading the aggregate, storage means for the graded aggregate arranged within the zone of heat radiated from the drum, storage means for the binder material also arranged within the zone of heat radiated from the drum, heating coils in the latter storage means, a casing inclosing the boiler, drum, grading means and storage means for the aggregate and binder for conserving the heat, proportioning devices for the aggregate and binder respectively arranged below the casing, connections between the heating coils and the boiler for additionally heating the binder material from the boiler, an air compressor having connection with the boiler for operating it and also having connection with the storage tank of the binder material for agitating said material, a mixer for the aggregate and binder, a motor receiving power from said boiler, connections between the motor and the drum and mixer for operating said drum and mixer, and connections between the proportioning device for the binder and the boiler to admit pressure for forcing the binder material to the mixer, and means driven from the motor for conveying the aggregate from the aggregate-proportioning means to the mixer and discharging it to the latter while in heated condition.

13. In a plant for manufacturing paving material, the combination of a rotatable drum provided with a peripheral discharge opening, a screen carried by said drum and spaced about the periphery of the latter for receiving the discharge from such opening, means for feeding mineral aggregate to said drum, and means for rotating said drum and screen.

14. In a plant for manufacturing paving material, the combination of a drying device for the mineral aggregate, a furnace, a flue for directing the hot gases from said furnace through said drying device, a vertically shiftable valve for controlling said flue, a cradle supporting said valve, a power cylinder secured to said cradle, a fixed plunger extending within said cylinder, and valve-controlled means for supplying a fluid under pressure to said cylinder for actuating said valve.

15. In a plant for manufacturing paving material, the combination of a drying device for the mineral aggregate, a furnace, a flue for directing the hot gases from said furnace through said drying device, a vertically shiftable valve for controlling said flue, a cradle supporting said valve, a vertical power cylinder for operating said cradle, a packing gland on the lower end of said power cylinder, a vertical plunger extending slidably through said packing gland, supports for said plunger, and valve-controlled means for supplying a fluid under pressure to said power cylinder for actuating said valve.

16. In a plant for manufacturing paving material, the combination of a drying device for the mineral aggregate, a receptacle for the binder material, steam coils in said receptacle, an air compressor for supplying compressed air to the lower portion of said receptacle, means for screening the dried aggregate, storage hoppers for receiving the screened aggregate, a motor for operating the plant, a common boiler for supplying steam to said steam coils, air compressor, and motor, a furnace for said boiler, means for heating said drying device by the hot gases from said furnace, said screening device, storage hoppers, and binder receptacle being located in the zone of heat from the drying device and heated by the waste heat from said drying device.

17. In a plant for manufacturing paving material, the combination of a rotatable drum provided with a peripheral discharge opening, a screen carried by said drum and spaced about the periphery of the latter for receiving the discharge from such opening, means for feeding mineral aggregate to said drum, means for rotating said drum and screen, a storage hopper surrounding said drum and screen for receiving the screened aggregate from the latter, and means for supplying heat to said drum.

18. In a device for manufacturing paving material the combination with a furnace, of a rotative drum connected to said furnace through which the products of combustion pass from the furnace, means for feeding mineral aggregate into said drum, grading screens surrounding and rotating with the drum, bins into which the material that passes through the screens is received, one of said screens having an open end through which oversize material is discharged.

19. A plant for manufacturing paving material comprising, in combination, a furnace having a stack, a longitudinally disposed drum, one end of which is contiguous to the furnace and open thereto, a second stack to which the end of the drum remote from the furnace is open to cause the products of combustion to pass through the drum on the way to the second stack and a valve for controlling access of the products of combustion from the furnace to the drum.

20. A plant for manufacturing paving material comprising, in combination, a furnace, a pair of stacks one of which is directly connected to the furnace, a drying drum constituting a connection between the furnace and the other of said stacks and valvular means for each of said stacks for controlling the passage of the products of combustion therethrough.

In testimony whereof I affix my signature in the presence of two witnesses.

LAWRENCE BATES WEST.

Witnesses:
E. G. BILLINGSLEY,
J. R. HIGGINS.